(12) United States Patent
Erdozain et al.

(10) Patent No.: US 12,741,708 B1
(45) Date of Patent: Sep. 22, 2026

(54) COLLABORATIVE ROBOTS

(71) Applicant: COLLABORATIVE ROBOTICS, San Francisco, CA (US)

(72) Inventors: Jack Erdozain, Santa Clara, CA (US); Brandon Porter, Saratoga, CA (US); Jane G. Mooney, Cody, WY (US); Stephanos Constantinos Tryphonas, San Jose, CA (US)

(73) Assignee: COLLABORATIVE ROBOTICS, Santa Clara, CA (US)

( * ) Notice: Subject to any disclaimer, the term of this patent is extended or adjusted under 35 U.S.C. 154(b) by 396 days.

(21) Appl. No.: 18/480,414

(22) Filed: Oct. 3, 2023

Related U.S. Application Data

(60) Provisional application No. 63/378,173, filed on Oct. 3, 2022.

(51) Int. Cl.
*B62D 57/02* (2006.01)
*B25J 5/00* (2006.01)

(52) U.S. Cl.
CPC ............ *B62D 57/022* (2013.01); *B25J 5/007* (2013.01)

(58) Field of Classification Search
CPC .............................. B62D 57/022; B25J 5/007
See application file for complete search history.

(56) References Cited

U.S. PATENT DOCUMENTS 7,826,925 B2 * 11/2010 Shishido .............. B25J 19/0091 297/238
10,532,464 B1 * 1/2020 Guzman ................ B25J 19/005
2009/0308668 A1 * 12/2009 Roh ..................... B62D 57/032 901/1
2017/0291299 A1 * 10/2017 Mullen .................... B25J 9/161
2021/0369841 A1 * 12/2021 Storm ................ A61K 39/3955
2022/0215336 A1 * 7/2022 Hurst .................. G05D 1/0287

* cited by examiner

*Primary Examiner* — Alentin Neacsu
*Assistant Examiner* — Marlon A Arce
(74) *Attorney, Agent, or Firm* — Maschoff Brennan

(57) ABSTRACT

A collaborative robot may include a torso, a first joint member, a first appendage, a second joint member, and a second appendage. The first joint member and the second joint member may be coupled to the torso. The first joint member and the second joint member may move along a length of the torso along a plane. The first joint member may pivot around a first axis to facilitate movement of the first joint member along an arc around the first axis. The second joint member may pivot around a second axis to facilitate movement of the second joint member along an arc around the second axis. The first appendage and the second appendage may be operatively coupled to the first joint member and the second joint member respectively. The first appendage may pivot around a second axis and the second appendage may pivot around a fourth axis.

21 Claims, 6 Drawing Sheets

102
113a
219a
220a
101
112
240
219b
220b 113b
291
150
123a
122
230b
123b 400
460a
465a
420a
413a
233a
499a
112
416a
417a
433a
458a
457a
455a
440
245a
491
493
401
245b
452
214
439
224
455b
237b
235
122
433b
233b
457b
429
458b
228a
123a
231
465b
460b
499b
416b
417b
418a
420b
418b
413b
230a
226b
228b
123b
230b

COLLABORATIVE ROBOTS

CROSS-REFERENCE TO RELATED APPLICATION

This patent application claims the benefit of and priority to U.S. Provisional App. No. 63/378,173 filed Oct. 3, 2022, titled "MECHANICAL AND OPERATIONAL ELEMENTS OF COLLABORATIVE ROBOTS," which is incorporated in the present disclosure by reference in its entirety.

FIELD

Embodiments described herein relate to collaborative robots.

BACKGROUND

Unless otherwise indicated in the present disclosure, the materials described in the present disclosure are not prior art to the claims in the present application and are not admitted to be prior art by inclusion in this section.

Robots have been used in recent years to automate tasks in various manufacturing, warehouse, logistics, and delivery settings. Robotics has been useful in making repetitive tasks more efficient, thereby improving efficiency and lowering costs. Robots can operate in settings that might otherwise be dangerous and can easily perform actions that are not feasible for human workers because of location, time of day, repetitions, ambient conditions, or excessive weight.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A collaborative robot may include a torso, a first joint member, a first appendage, a second joint member, and a second appendage. The first joint member may be operatively coupled to the torso. The first joint member may be configured to move relative to a first portion of a length of the torso along a plane and pivot around a first axis to facilitate movement of the first joint member along an arc around the first axis. The first appendage may include a proximal end that is operatively coupled to the first joint member. The first appendage may be configured to pivot around a second axis to facilitate movement of the first appendage along an arc around the second axis. The second joint member may be operatively coupled to the torso. The second joint member may be configured to move relative to a second portion of the length of the torso along the plane and pivot around a third axis to facilitate movement of the second joint member along an arc around the third axis. The second appendage may comprise a proximal end that is operatively coupled to the second joint member. The second appendage may be configured to pivot around a fourth axis to facilitate movement of the second appendage along an arc around the fourth axis.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

Figure 1:
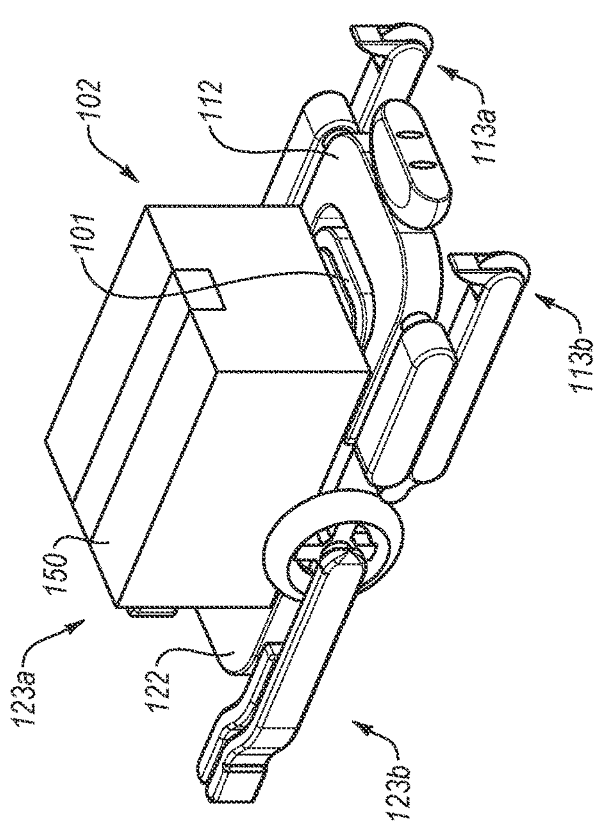
FIG. 1 illustrates an example operational environment in which a collaborative robot may operate.
Figure 1:
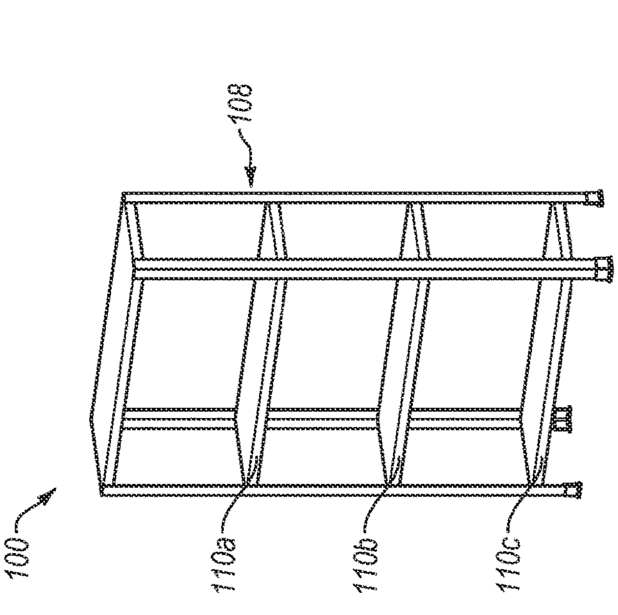
Figure 1:
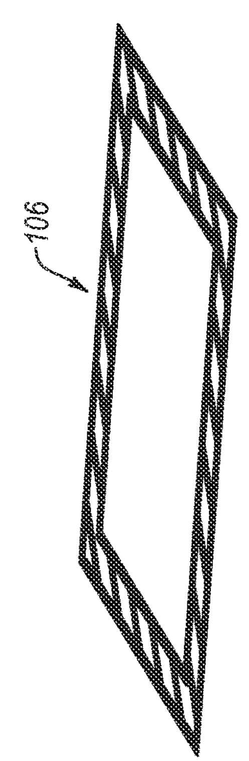

in accordance with at least one embodiment of the present disclosure.

DETAILED DESCRIPTION

Some robots may be designed to perform specific functions and/or operate in particular environments. For example, the robots may be designed to interact with specific types of loads in a particular warehouse. The robots may include limited capabilities due to being designed to only perform the specific functions, only operate in the particular environments, or both. The robots may lack capabilities to perform other functions and/or operate in other environments without further development, changing components, or both of the robots. In addition, the robots may not be capable of operating in dynamic environments.

The present disclosure relates to collaborative robots ("cobots") that provide degrees of freedom of movement, capabilities, or both that the robots lack. The cobots may be configured to dynamically perform functions and/or operate in the dynamic environments. For example, the cobots may be configured to interact with different loads and/or perform functions while directly and/or indirectly collaborating with humans (e.g., in a same environment as the humans). As another example, the cobots may include joint members that couple appendages of the cobots to torsos of the cobots to add to the degrees of freedom. In particular, the joint members may permit the appendages to move independent of the torsos of the cobots. The joint members may permit the cobots to adjust a center of gravity of the cobots in response to features in the environment, transition between states, or both. For example, the cobots may transition between a crawling state, an intermediate crawling state, and/or a standing state.

The cobots may be configured to transition between different states to perform functions at different heights. The cobots may operate in the different states to move, retrieve, interact, and/or position loads at different heights within the environment. The joint members may permit the cobots to adjust a reach of the cobots in the different states to position the loads at the different heights without moving the torsos. In addition, a capability to transition between the multiple states may permit the cobots to operate in the dynamic environment. For instance, the cobots may transition between different states while performing a task and/or while moving within the environment in response to features and/or changes in the environment.

The cobots may include appendages or other features that permit the cobots to work with loads of different shapes, weights, or other configurations. In addition, the cobots may include modular designs that permit parts, portions of the cobots, or both to be serviced independently.

The embodiments of the present disclosure may permit the cobots to perform different and/or dynamic functions and/or operate in the dynamic environments. Additionally, the capability to transition between the different states and/or move the appendages of the cobots may permit the cobots to move the loads within the environments at varying heights and/or position the loads on and off the cobots at varying heights.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates an example operational environment 100 in which a cobot 102 may operate, in accordance with at least one embodiment described in the present disclosure. The environment 100 may include different facilities, settings, or buildings. For example, the environment 100 may include a warehouse, a fulfillment site, a hospital, a farm, a hotel, a motel, a campus, or any other environment in which the cobot 102 may provide logistical support.

The environment 100 may include a storage rack 108 and a loading area 106. The cobot 102 may move and/or position a load 150 within the environment 100. The load 150 may include uniform containers, uniform packages, uniform carts, non-uniform containers, non-uniform packages, non-uniform carts, or any other load type. In some embodiments, uniform containers, uniform packages, and/or uniform carts may include loads that include the same shape, size, weight, or some combination thereof. In these and other embodiments, non-uniform containers, non-uniform packages, and/or non-uniform carts may include loads that include different shapes, sizes, weights, or some combination thereof.

The cobot 102 may move within the environment 100 to position the load 150 on and off the cobot 102 at different locations and move the load 150 within the environment 100. For example, the cobot 102 may position the load 150 on the cobot 102 from the loading area 106 (which may correspond to a ground surface or a raised surface), move within the environment 100, and position the load 150 off the cobot 102 on shelves 110*a-c* of the storage rack 108. As another example, the cobot 102 may position the load 150 on the cobot 102 from the shelves 110*a-c* of the storage rack 108, move within the environment 100, and position the load 150 off the cobot 102 on the loading area 106. As yet another example, the cobot 102 may position the load 150 on the cobot 102 from the shelf 110*a* of the storage rack 108, adjust relative to the storage rack 108, and position the load 150 off the cobot 102 on the shelf 110*c* of the storage rack 108.

A first joint member 112 and/or a second joint member 122 of the cobot 102 may increase degrees of freedom of movement of the cobot 102. In particular, the first joint member 112 and/or the second joint member 122 may permit appendages 113*a-b* and 123*a-b* of the cobot 102 to move independent of a torso 101 of the cobot 102. For example, the first joint member 112 and/or the second joint member 122 may move and/or pivot relative to the torso 101 to allow the appendages 113*a-b* and 123*a-b* to pivot, extend, and/or retract independent of the torso 101.

The first joint member 112 and/or the second joint member 122 may permit the cobot 102 to adjust the reach of the cobot 102 with or without moving the torso 101. For instance, the first joint member 112 and/or the second joint member 122 may move relative to a plane of the torso 101 to allow the appendages 113*a-b* and 123*a-b* to reach higher from the ground surface. Additionally, the first joint member 112 and/or the second joint member 122 may allow the torso 101 and the appendages 113*a-b* and 123*a-b* to move independently with respect to each other. In some embodiments, the cobot 102 may be configured to operate in and transition between a standing state, a crawling state, an intermediate crawling state, or between these states to position the load 150 on and off the cobot 102 at different heights within a range of heights relative to the ground surface.

In some embodiments, the cobot 102 may adjust a height, a position, an orientation, or some combination thereof of one or more parts of the cobot 102 to position the load 150 on or off the cobot 102 within the range of heights. For example, the cobot 102 may adjust a height of the torso 101 relative to the ground surface, a position and/or an orientation of the first joint member 112 and/or the second joint member 122 relative to the torso 101, a position and/or an orientation of the appendages 113*a-b* and/or 123*a-b* relative to the first joint member 112 and/or the second joint member 122 to position the load 150 on or off the cobot 102 within the range of heights.

In some embodiments, the first joint member 112 and/or the second joint member 122 may permit the cobot 102 to dynamically move within the environment 100 in response to obstacles and/or features of the environment 100. For instance, the cobot 102 may adjust a center of gravity of the cobot 102 to increase a stability of the cobot 102 when moving along slick surfaces, along sloped surfaces, over/around obstacles, or any other feature of the environment 100. Additionally or alternatively, the cobot 102 may adjust the center of gravity of the cobot 102 to compensate for the load 150 when positioned on the cobot 102. For example, the cobot 102 may adjust the center of gravity of the cobot 102 to maintain a general level position of the load 150 while moving within the environment 100. The cobot 102 may adjust the center of gravity of the cobot 102 to adjust operational features of the cobot 102.

In some embodiments, the cobot 102 may cause the first joint member 112, the second joint member 122, or both to pivot around a first axis and/or a second axis, described in more detail below, to cause the cobot 102 to transition between the crawling state, the intermediate crawling state, and the standing state. For example, the cobot 102 may cause the first joint member 112, the second joint member 122, or both to rotate to increase the distance between the torso 101 and the ground surface to permit the appendages 113*a-b* and/or 123*a-b* to at least partially extend and cause the cobot 102 to transition from the crawling state to the intermediate state. As another example, the cobot 102 may cause the first joint member 112, the second joint member 122, or both to rotate to decrease the distance between the torso 101 and the ground surface to control an approach of the cobot 102 to the ground surface as the cobot 102 transitions from the intermediate walking state to the crawling state. As yet another example, the cobot 102 may cause the first joint member 112, the second joint member 122, or both to rotate to cause the appendages 123*a-b* and/or the torso 101 to extend in a direction that is substantially perpendicular to the ground surface to put the cobot 102 in the standing state or to control the torso 101 and/or the appendages 113*a-b* and/or 123*a-b* as the cobot 102 transitions from the standing state to the intermediate crawling state.

The cobot 102 may move, work, adapt, react, or some combination thereof within the environment 100 while avoiding obstacles. For example, the cobot 102 may adjust the height of the torso 101 relative to the ground surface, adjust the position and/or the orientation of the first joint member 112 and/or the second joint member 122 relative to the torso 101, adjust the position and/or the orientation of the appendages 113*a-b* and/or 123*a-b* relative to the first joint member 112 and/or the second joint member 122, or change the state of the cobot 102 to adaptively respond to the obstacles.

The cobot 102 is illustrated in FIG. 1 in the crawling state for example purposes. The cobot 102 may also operate and/or move within the environment 100 in the standing state, the intermediate crawling state, or between states. The load 150 is illustrated in FIG. 1 as a box positioned on the cobot 102 for example purposes. However, the load 150 may include any load type and may be positioned anywhere within the environment 100. For example, the load 150 may be on the shelves 110*a-c* of the storage rack 108, the loading area 106, the ground surface of the environment 100, or any other appropriate location.

Modifications, additions, or omissions may be made to the environment 100 without departing from the scope of the present disclosure. For example, in some embodiments, the environment 100 may include any number of other components that may not be explicitly illustrated or described. For example, the storage rack 108 may be omitted or additional storage racks may be included. As another example, the storage rack 108 may include a different number of shelves 110*a-c* (e.g., one, two, four, or more shelves).

Figure 2A:
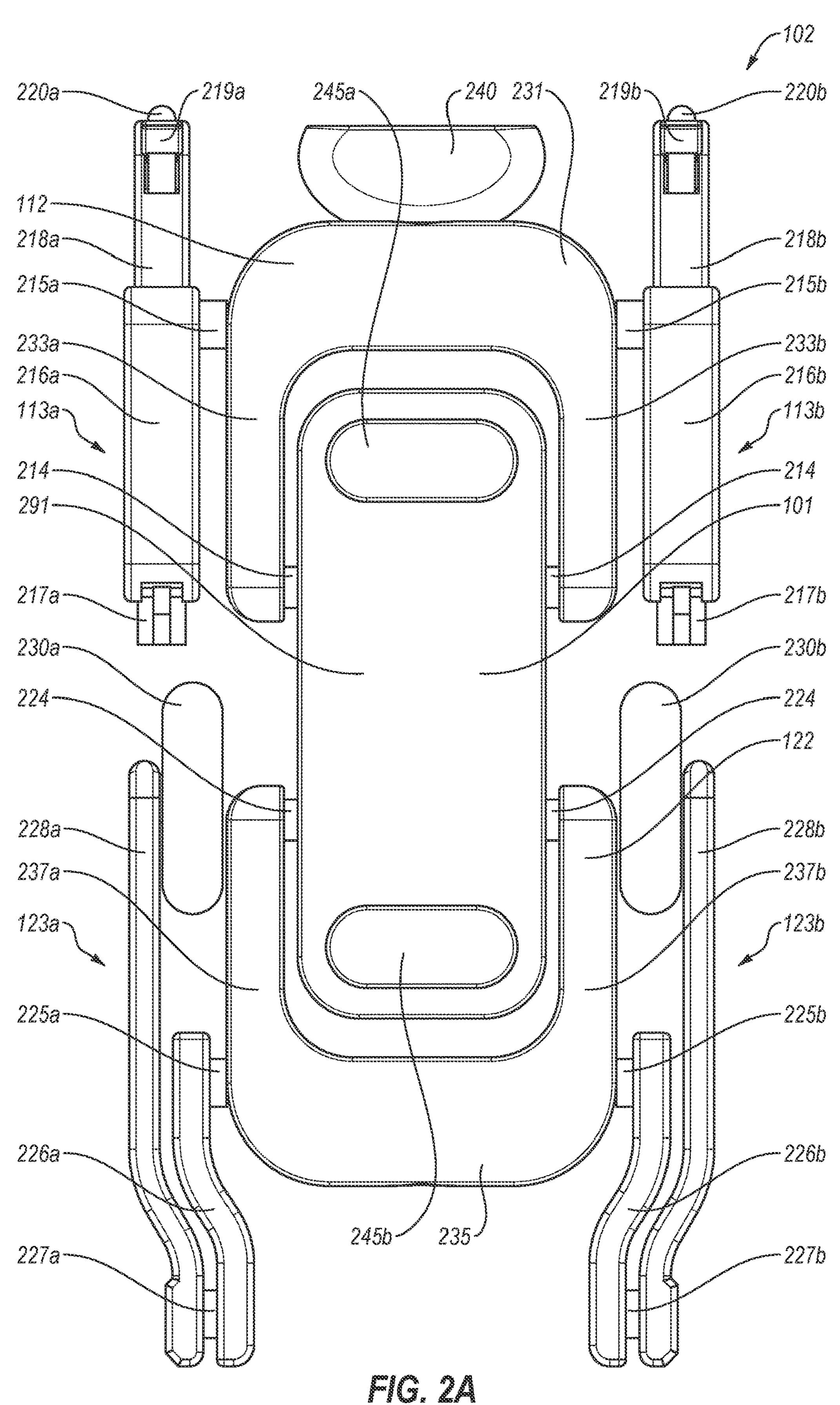
FIG. 2A illustrates the collaborative robot of FIG. 1 in a crawling state.
Figure 2B:
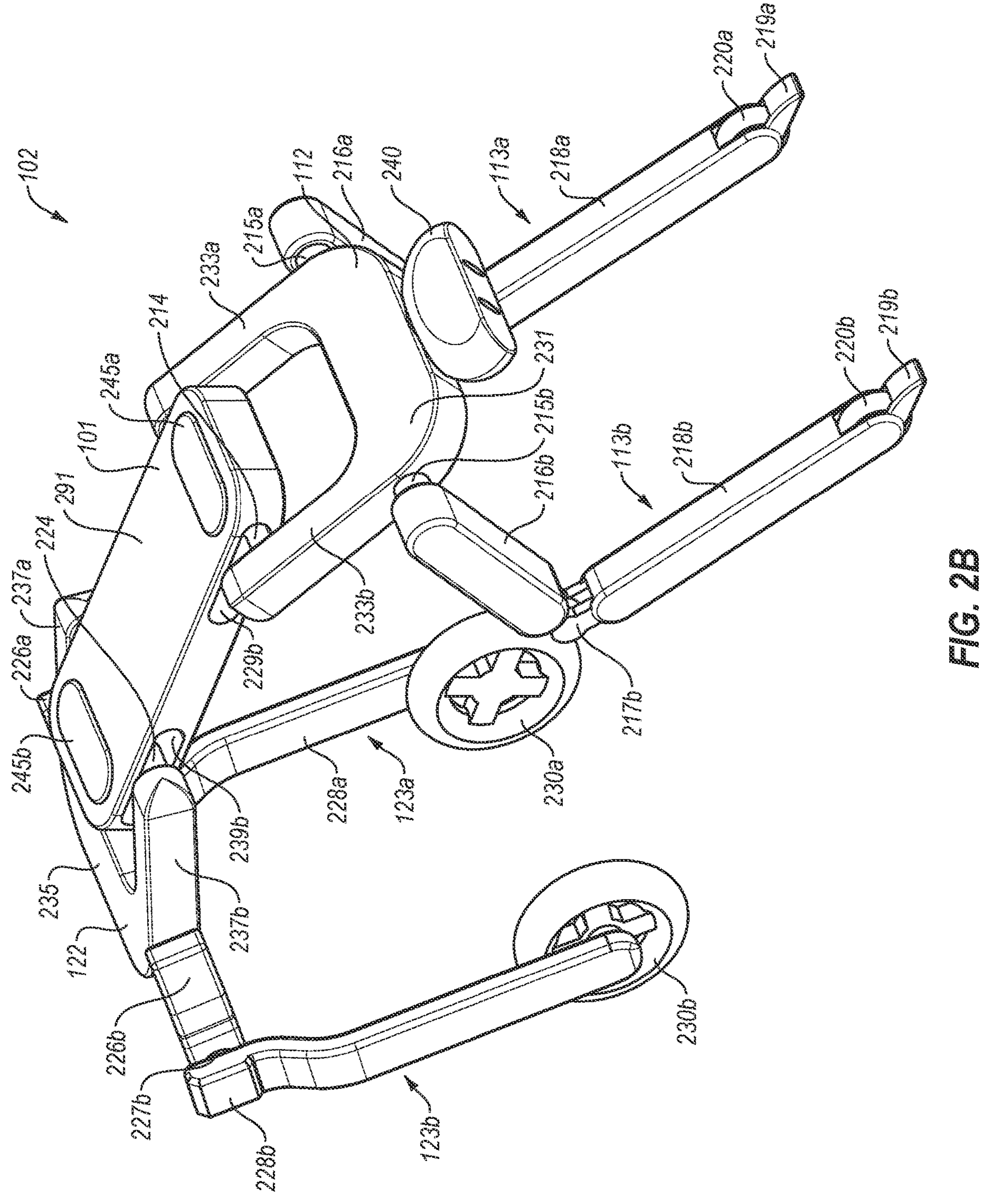
FIG. 2B illustrates the collaborative robot of FIG. 1 in an intermediate crawling state.
Figure 2C:
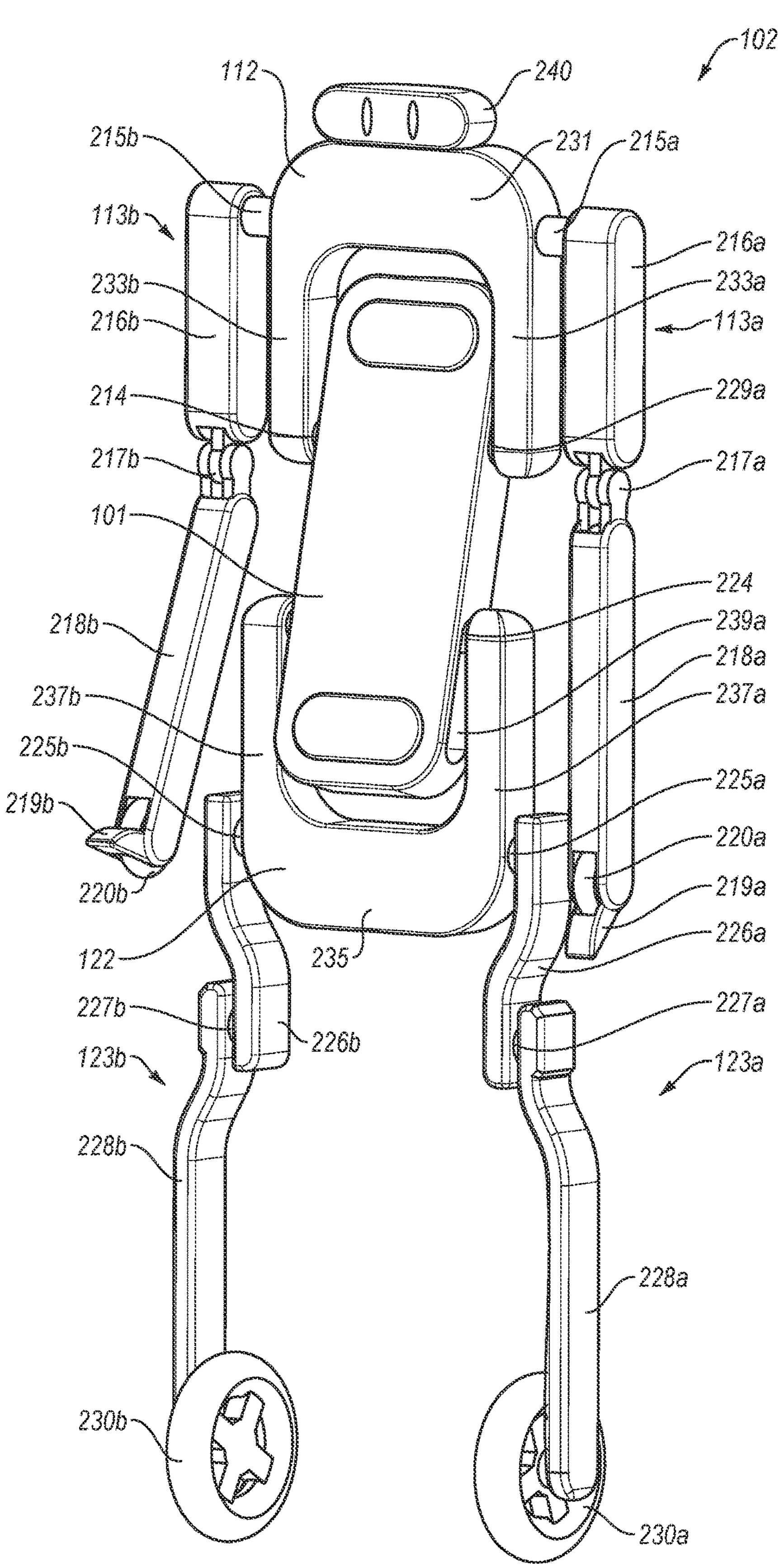
FIG. 2C illustrates the collaborative robot of FIG. 1 in a standing state.

FIGS. 2A-2C illustrate different views of the cobot 102 of FIG. 1, in accordance with at least one embodiment described in the present disclosure. FIG. 2A illustrates the cobot 102 in the crawling state. FIG. 2B illustrates the cobot 102 in the intermediate crawling state. FIG. 2C illustrates the cobot 102 in the standing state.

With combined reference to FIGS. 2A-2C, the cobot 102 may include a sensor appendage 240 that is operatively coupled to the first joint member 112. The first joint member 112 and the second joint member 122 may be operatively coupled to the torso 101. In particular, the first joint member 112 may be operatively coupled to the torso 101 via a first joint 214 and the second joint member 122 may be operatively coupled to the torso 101 via a second joint 224. As used in the present disclosure, the term "operatively coupled" may mean items are connected to each other while being able to move relative to each other.

The sensor appendage 240 may be operatively coupled to the first joint member 112 such that the sensor appendage 240 can move relative to the first joint member 112 to transition between different positions when the cobot 102 is in the different states. For example, the sensor appendage 240, when the cobot 102 is in the crawling state, may be in a first position such that the sensor appendage 240 is oriented forward (vertical direction of the page as shown in FIG. 2A). As another example, the sensor appendage 240, when the cobot 102 transitions from the crawling state or the intermediate crawling state to the standing state, may move relative to the first joint member 112 from the first position to a second position such that the sensor appendage 240 is oriented forward (generally out of the page in as shown in FIG. 2C).

The appendages 113*a-b* may include forearm portions 218*a-b* and upper arm portions 216*a-b*. The upper arm portions 216*a-b* may be operatively coupled to the first joint member 112 via shoulder joints 215*a-b*. In particular, proximal ends of the upper arm portions 216*a-b* may be operatively coupled to the first joint member 112 via the shoulder joints 215*a-b*. The forearm portions 218*a-b* may be operatively coupled to the upper arm portions 221*a-b* via elbow joints 217*a-b*. Further, the appendages 113*a-b* may include hands 219*a-b* operatively coupled to or operatively coupled proximate to distal ends of the forearm portions 218*a-b*.

The appendages 123*a-b* may include upper leg portions 226*a-b* and lower leg portions 228*a-b*. The upper leg portions 226*a-b* may be operatively coupled to the second joint member 122 via hip joints 225*a-b*. Specifically, proximal ends of the upper leg portions 226*a-b* may be operatively coupled to the second joint member 122 via the hip joints 225*a-b*. The lower leg portions 228*a-b* may be operatively coupled to the upper leg portions 226*a-b* via knee joints 227*a-b*.

In some embodiments, the first joint member 112 may include a body 231, a first member 233*a*, and a second member 233*b*. In these and other embodiments, the first member 233*a* may extend from a first end of the body 231 and the second member 233*b* may extend from a second end of the body 231. The first joint 214 may be coupled to the first member 233*a* and the second member 233*b*. In some embodiments, the first joint 214 may be received by shoulder openings 229*a-b* (shown in FIGS. 2B and 2C) defined by the torso 101. In these and other embodiments, as shown in FIGS. 2B and 2C, the first joint 214 may include a member that extends through the shoulder openings 229*a-b* and the torso 101. In other embodiments, the first joint 214 may include multiple members that are received by the shoulder openings 229*a-b* and are operatively coupled to the torso 101 proximate or within the torso 101.

The second joint member 122 may include a body 235, a first member 237*a*, and a second member 237*b*. The first member 237*a* may extend from a first end of the body 235 and the second member 237*b* may extend from a second end of the body 235. The second joint 224 may be coupled to the first member 237*a* and the second member 237*b*. In some embodiments, the second joint 224 may be received by hip openings 239*a-b* (shown in FIGS. 2B and 2C) defined by the torso 101. In these and other embodiments, as shown in FIGS. 2B and 2C, the second joint 224 may include a member that extends through the torso 101. In other embodiments, the second joint 224 may include multiple members that are received by the hip openings 239*a-b* and are operatively coupled to the torso 101.

The first joint 214 may facilitate movement of the first joint member 112 relative to the torso 101. The first joint 214 may facilitate pivoting of the first joint member 112 around the first axis, which corresponds to the first joint 214 to facilitate movement of the first joint member 112 along an arc around the first axis. For instance, the first joint 214 may pivot around the first axis to align the first joint member 112 with the torso 101. Additionally or alternatively, the first joint 214 may pivot around the first axis such that the first joint member 112 extends at an angle relative to the torso 101. The angle at which the first joint member 112 extends relative to the torso 101 may be equal to or between ten degrees and three hundred seventy degrees in a clockwise direction.

Additionally or alternatively, the first joint 214 may move along a plane relative to a first portion of a length of the torso 101. In some embodiments, the first portion of the length of the torso 101 may correspond to a length or a portion of the length of the shoulder openings 229*a-b*. In some embodiments, the first joint 214 may pivot around the first axis and move along the plane simultaneously and/or in series to facilitate different types of movements of the first joint member 112.

The shoulder joints 215*a-b* may facilitate movement of the upper arm portions 216*a-b* relative to the first joint member 112. For example, the shoulder joints 215*a-b* may facilitate movement of the upper arm portions 216*a-b* in multiple directions relative to the first joint member 112. As another example, the shoulder joints 215*a-b* may facilitate pivoting of the upper arm portions 216*a-b* around axes with respect to the shoulder joints 215*a-b* to facilitate movement of the upper arm portions 216*a-b* along arcs around the corresponding axes. In some embodiments, the shoulder joints 215*a-b* may include any suitable joints such as prismatic joints, cylindrical joints, planar joints, flexure joints, soft joints, infinite joints, spherical joints, revolute joints, or some combination thereof.

The elbow joints 217*a-b* may act as interfaces between proximal ends of the forearm portions 218*a-b* and distal ends of the upper arm portions 216*a-b*. In addition, the elbow joints 217*a-b* may facilitate movement of the forearm portions 218*a-b* relative to the upper arm portions 216*a-b*. For instance, the elbow joints 217*a-b* may facilitate pivoting of the forearm portions 218*a-b* around axes with respect to the elbow joints 217*a-b* to facilitate movement of the forearm portions 218*a-b* along arcs around the corresponding axes.

The second joint 224 may facilitate movement of the second joint member 122 relative to the torso 101. The second joint 224 may facilitate pivoting of the second joint member 122 around the second axis, which corresponds to the second joint 224 to facilitate movement of the second joint member 122 along an arc around the second axis. For instance, the second joint 224 may pivot around the second axis to align the second joint member 122 with the torso 101. Additionally or alternatively, the second joint 224 may pivot around the second axis such that the second joint member 122 extends at an angle relative to the torso 101. The angle at which the second joint member 122 extends relative to the torso 101 may be equal to or between ten degrees and three hundred seventy degrees in a clockwise direction.

Additionally or alternatively, the second joint 224 may move along a plane relative to a second portion of the length of the torso 101. In some embodiments, the second portion of the length of the torso 101 may correspond to a length or a portion of the length of the hip openings 239*a-b*. In some embodiments, the second joint 224 may pivot around the second axis and move along the plane simultaneously and/or in series to facilitate different types of movements of the second joint member 122.

The hip joints 225*a-b* may act as interfaces between proximal ends of the upper leg portions 226*a-b* and the second joint member 122. In addition, the hip joints 225*a-b* may facilitate movement of the upper leg portions 226*a-b* relative to the second joint member 122. For example, the hip joints 225*a-b* may facilitate movement of the upper leg portions 226*a-b* in multiple directions relative to the second joint member 122. As another example, the hip joints 225*a-b* may facilitate pivoting of the upper leg portions 226*a-b* around axes with respect to the hip joints 225*a-b* to facilitate movement of the upper leg portions 226*a-b* along arcs around the corresponding axes. In some embodiments, the hip joints 225*a-b* may include any suitable joints such as prismatic joints, cylindrical joints, planar joints, flexure joints, soft joints, infinite joints, spherical joints, revolute joints, or some combination thereof.

The knee joints 227*a-b* may act as interfaces between distal ends of the upper leg portions 226*a-b* and proximal ends of the lower leg portions 228*a-b*. In addition, the knee joints 227*a-b* may facilitate movement of the lower leg portions 228*a-b* relative to the upper leg portions 226*a-b*. For instance, the knee joints 227*a-b* may facilitate pivoting of the lower leg portions 228*a-b* around axes with respect to the knee joints 227*a-b* to facilitate movement of the lower leg portions 228*a-b* along arcs around the corresponding axes.

The cobot 102 may include a first set of wheels 220*a-b* that are operatively coupled to the distal ends of the forearm portions 218*a-b*. In addition, the cobot 102 may include a second set of wheels 230*a-b* that are operatively coupled to distal ends of the lower leg portions 228*a-b*. The first set of wheels 220*a-b* and the second set of wheels 230*a-b* may permit the cobot 102 to move within the environment 100 in the crawling state, the intermediate crawling state, the standing state, or between these states.

In some embodiments, the sensor appendage 240 may detect the load 150, obstacles, and/or terrain around the cobot 102. For instance, the sensor appendage 240 may include a sensor configured to identify obstacles proximate the cobot 102 within the environment 100. In these and other embodiments, the sensor may include any type of sensor suitable to detect the obstacles. For example, the sensor may include a camera and/or a radar sensor that may detect the obstacles.

In some embodiments, the first joint member 112 and the second joint member 122 may include degrees of freedom of movement to permit the appendages 113*a-b* and/or 123*a-b* to move independent of the torso 101. For example, the first joint member 112 may permit a height of a reach of the appendages 113*a-b* to be adjusted with or without adjusting a height of the torso 101 relative to the ground surface. As another example, the first joint member 112 may permit the angle at which the appendages 113*a-b* extend relative to the torso 101 to change independent of the torso 101.

With reference to FIG. 2A, in the crawling state, the appendages 113*a-b* and 123*a-b* may be in a folded state or a stacked state to reduce a profile of the cobot 102. Additionally or alternatively, the appendages 113*a-b* and 123*a-b* may be in the folded state or the stacked state such that the various portions of the appendages 113*a-b* and 123*a-b* are aligned with the torso 101.

The upper arm portions 216*a-b* and the forearm portions 218*a-b* may include similarly shaped profiles to permit the appendages 113*a-b* to stack on themselves. For example, as shown in FIG. 2A, the upper arm portions 216*a-b* and the forearm portions 218*a-b* both include substantially straight profiles to permit the upper arm portions 216*a-b* and the forearm portions 218*a-b* to stack on themselves. The upper leg portions 226*a-b* and the lower leg portions 228*a-b* may include similarly shaped profiles and be on different planes to permit the appendages 123*a-b* to fold in on themselves. For example, the upper leg portions 226*a-b* may include a curved profile that is similarly shaped to the lower leg portions 228*a-b* and be positioned on different planes than the lower leg portions 228-*b* to permit the appendages 123*a*-*b* to fold in on themselves.

In the crawling state, the cobot 102 may traverse the environment 100 using the first set of wheels 220*a*-*b* and the second set of wheels 230*a*-*b*. In some embodiments, a top surface 291 of the torso 101 may serve as a cargo storing region in the crawling state. In some embodiments, the crawling state may represent a more stable configuration and/or a configuration of the cobot 102 configured to permit the cobot 102 to travel at higher speeds due to the lowered center of gravity to reduce a risk of the cobot 102 falling over and/or flipping, distribute weight across the first set wheels 220*a*-*b* and the second set of wheels 230*a*-*b*, or both.

In the crawling state, the cobot 102 may adjust a wheelbase of the cobot 102. Adjusting the wheelbase of the cobot 102 may include adjusting contact points between the first set of wheels 220*a*-*b*, the second set of wheels 230*a*-*b*, or both and the ground surface relative to the torso 101. In particular, the cobot 102 may adjust a distance between the torso 101 and the contact points of the first set of wheels 220*a*-*b*, a distance between the torso 101 and the contact points of the second set of wheels 230*a*-*b*, or both. In some embodiments, in the crawling state, the cobot 102 may cause the first joint 214, the second joint 224, or both to move along the plane to adjust the distance between the torso 101 and the contact points of the first set of wheels 220*a*-*b* and/or the distance between the torso 101 and the contact points of the second set of wheels 230*a*-*b*.

With reference to FIG. 2B, in the intermediate crawling state, the appendages 113*a*-*b* and/or 123*a*-*b* may be partially unfolded or extended from the first joint member 112 and/or the second joint member 122 to control the height of the torso 101 relative to the ground surface and/or to support the cobot 102. Additionally or alternatively, the first joint member 112, the second joint member 122, or both may extend from the torso 101 towards the ground surface to control the height of the torso 101 relative to the ground surface and/or to support the cobot 102.

In some embodiments, the cobot 102, in the intermediate crawling state, may travel over certain obstacles or features of the environment 100. For instance, the torso 101 may be raised above the ground surface to permit the obstacles to pass below the torso 101. Additionally or alternatively, the appendages 113*a*-*b* and/or 123*a*-*b*, the first joint member 112, and/or the second joint member 122 may operate as a suspension for the cobot 102 while moving in the environment 100, which may permit the cobot 102 to travel over certain obstacles.

In some embodiments, the appendages 113*a*-*b* and/or 123*a*-*b*, the first joint member 112, and/or the second joint member 122, in the intermediate crawling state, may permit the height of the torso 101 relative to the ground surface to be variable. For example, the cobot 102 may adjust the height of the torso 101 to position the load on and off the cobot 102 at different heights within the range of heights.

In the intermediate crawling state, the cobot 102 may traverse the environment 100 using the first set of wheels 220*a*-*b* and the second set of wheels 230*a*-*b*. In some embodiments, the top surface 291 of the torso 101 may serve as the cargo storing region in the intermediate crawling state.

In the intermediate crawling state, the cobot 102 may adjust the wheelbase of the cobot 102. In some embodiments, in the intermediate crawling state, the cobot 102 may cause the first joint 214, the second joint 224, or both to move along the plane to and/or pivot around the first axis and/or the second axis to adjust the distance between the torso 101 and the contact points of the first set of wheels 220*a*-*b* and/or the distance between the torso 101 and the contact points of the second set of wheels 230*a*-*b*. For example, the cobot 102 may cause the first joint member 112, the second joint member 122, or both to rotate to adjust the height of the torso 101 relative to the ground surface to increase or decrease the distance between the torso 101 and the contact points of the first set of wheels 220*a*-*b* and/or the second set of wheels 230*a*-*b*.

With reference to FIG. 2C, in the standing state (e.g., a segway state), the appendages 123*a*-*b* may be partially unfolded or extended from the second joint member 122 such that the appendages 123*a*-*b* and/or the torso 101 extend in the direction that is substantially perpendicular to the ground surface. Additionally or alternatively, the second joint member 122 may extend from the torso 101 towards the ground surface to control the height of the torso 101 relative to the ground surface. In addition, the appendages 113*a*-*b* may be free to move to interact with the load 150 and/or other items in the environment 100.

In the standing state, the cobot 102 may traverse the environment 100 using the second set of wheels 230*a*-*b*. In some embodiments, the cobot 102 in the standing state, may permit the cobot 102 to travel over certain obstacles or features of the environment 100. Additionally or alternatively, the appendages 123*a*-*b* and/or the second joint member 122 may operate as the suspension for the cobot 102 while moving in the environment 100 in the standing state.

In the standing state, the first joint 214 and/or the second joint 224 may facilitate movement of the first joint member 112 and/or the second joint member 122 relative to the length of the torso 101 to adjust the reach of the cobot 102. For example, the first joint 214 may move along the plane to move the first joint member 112 to increase the reach of the cobot 102. In addition, in the standing state, the first joint 214, the second joint 224, the hip joints 225*a*-*b*, the knee joints 227*a*-*b*, the shoulder joints 215*a*-*b*, the elbow joints 217*a*-*b*, or some combination thereof may facilitate movement of the appendages 113*a*-*b* and/or 123*a*-*b*, the first joint member 112, and/or the second joint member 122 to permit the cobot 102 to position the load 150 on or off the cobot 102.

In some embodiments, the first joint member 112 and/or the second joint member 122 may be configured to improve the stability of the cobot 102 in the standing state. For example, the first joint member 112 and/or the second joint member 122 may move relative to the torso 101 to shift the center of gravity of the cobot 102. The cobot 102 may move with more stability when faced with different obstacles and/or terrains by shifting the center of gravity accordingly. Additionally, the cobot 102 may shift the center of gravity using the first joint member 112 and/or the second joint member 122 to compensate for the load 150. For instance, the appendages 113*a*-*b* may interact with the load 150, which may cause the cobot 102 to be front heavy and the first joint member 112, the second joint member 122, and/or the torso 101 may move to compensate for the weight of the load 150.

With combined reference to FIGS. 2A-2C, in some embodiments, the appendages 113*a*-*b* may include the hands 219*a*-*b* that may be operatively coupled to the forearm portions 218*a*-*b* using wrist joints (not illustrated in FIGS. 2A-2C). In these and other embodiments, the wrist joints may permit the hands 219*a*-*b* to move relative to the forearm portion 218*a*-*b* to permit the cobot 102 to interact with the load 150. For example, the cobot 102 may pick up, push, pull, and/or otherwise interact with the load 150 using the hands 219*a*-*b*. Additionally or alternatively, the cobot 102 may use the hands 219*a-b* to reach to different heights within the range of heights (e.g., different heights at or above the height of the torso 101).

In the crawling state and/or the intermediate crawling state, the top surface 291 of the torso 101 may be configured to receive the load 150 by an external device positioning the load 150 on the top surface 291. Additionally or alternatively, in the crawling state, the cobot 102 may be configured to position the load 150 on the top surface 291 of the torso 101 itself. The cobot 102 may be configured to position the load 150 on the top surface 291 itself by causing the torso 101 to rest on the ground surface while extending the appendages 113*a-b* substantially forward (e.g., the direction the sensor appendage 240 faces) and substantially up (out of the page as shown in 2A) to permit the appendages 113*a-b* and/or the hands 219*a-b* to grab the load 150. In addition, the cobot 102 may move the appendages 113*a-b* such that the load 150 passes over the sensor appendage 240 and is positioned on the top surface 291 of the torso 101. After positioning the load 150 on the top surface 291, the appendages 113*a-b* move to raise the torso 101 off the ground surface. For example, the appendages 113*a-b* may return to the position shown in FIG. 2A to raise the torso 101 off the ground surface. As another example, the appendages 113*a-b* may move to raise the torso 101 off the ground surface while transitioning to the intermediate crawling state.

In some embodiments, the cobot 102 may include pads 245*a-b* attached to the top surface 291 of the torso 101. In some embodiments, the pads 245*a-b* may include an anti-skid material that may prevent the load 150 from falling off the top surface 291 during operation. Alternatively, the pads 245*a-b* may be omitted and the cobot 102 may include conveyor belts that rotate to position the load 150 on and off the cobot 102.

In some embodiments, the cobot 102 may be powered using a battery. For instance, the battery may be positioned within the torso 101. In these and other embodiments, the cobot 102 may be configured to swap the battery without powering down to permit continuous use of the cobot 102. In other embodiments, the cobot 102 may be powered using shore power.

In some embodiments, the cobot 102 may be configured to permit different parts of the cobot 102 to detach from the torso 101 to permit the different parts to be independently serviced. For example, the appendages 113*a-b* may be detached from the first joint member 112 to be independently serviced. In these and other embodiments, the cobot 102 may still operate while the detached parts are being serviced.

In some embodiments, the appendages 113*a-b* and/or 123*a-b*, the first joint member 112, and/or the second joint member 122 may extend between the torso 101 and the ground surface to permit the cobot 102 to transition between the crawling state, the intermediate crawling state, and the standing state. In some embodiments, only the forearm portions 118*a-b* may extend to raise the height of the torso 101 relative to the ground surface. Accordingly, in some embodiments, only the lower leg portions 228*a-b* may extend to raise height of the torso 101 relative to the ground surface.

In some embodiments, the appendages 113*a-b* and/or 123*a-b* may raise and lower the torso 101 in a simultaneous manner. For instance, the appendages 113*a-b* and/or 123*a-b* may move at a substantially same speed. The simultaneous manner may improve stability of the load 150 placed on top of the torso 101. Alternatively, the appendages 113*a-b* and/or 123*a-b* may raise and lower the torso 101 independent of each other.

In some embodiments, the first joint member 112 and the second joint member 122 may be configured to maintain a flat orientation of the torso 101 relative to the ground surface while carrying the load 150. For instance, in some embodiments, the appendages 113*a-b* and/or 123*a-b* may include different lengths. In these and other embodiments, the first joint member 112 may be configured to rotate more toward the ground surface than the second joint member 122 to compensate for the difference in the lengths of the appendages arm portions 113*a-b* and 123*a-b*.

Figure 3:
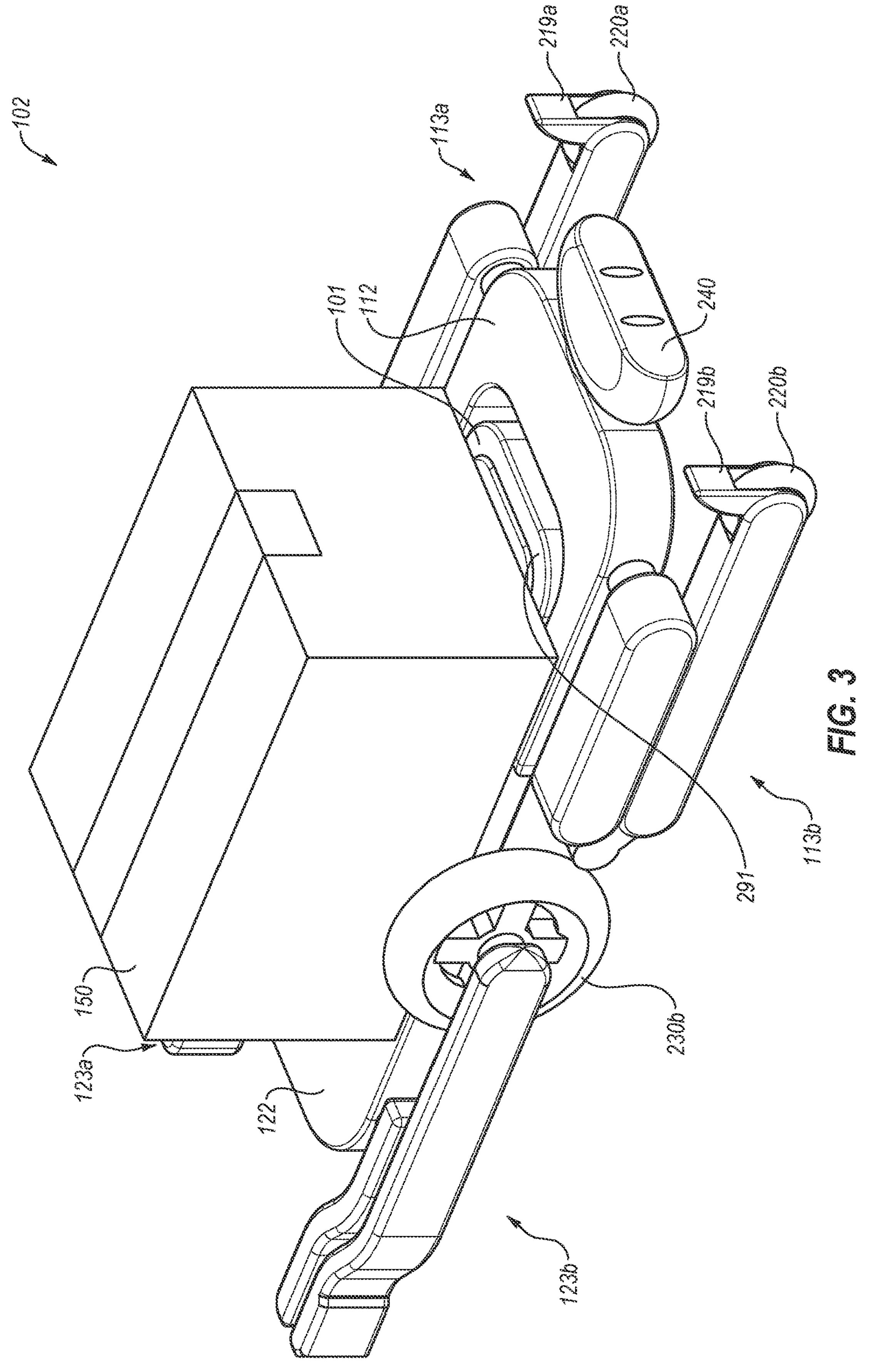
FIG. 3 illustrates the collaborative robot of FIG. 1 in the crawling state carrying a load.

FIG. 3 illustrates a perspective view of the cobot 102 in a crawling state with the load 150 being carried on the top surface 291 of the torso 101, the first joint member 112, the second joint member 122, or some combination thereof, in accordance with at least one embodiment described in the present disclosure. The cobot 102 may receive the load 150 on the torso 101 while the cobot 102 is in the crawling state as illustrated in FIG. 3 or in the intermediate crawling state (as shown in FIG. 2B).

In some embodiments, the cobot 102 may move through the environment 100 while carrying the load 150. For instance, the cobot 102 may move using the first set of wheels 220*a-b* and the second set of wheels 230*a-b*. In some embodiments, the first set of wheels 220*a-b* and the second set of wheels 230*a-b* may move forward (e.g., a direction faced by the sensor appendage 240), move backward (e.g., a direction the second joint member 122 extends), and/or turn as the cobot 102 is moving.

In some embodiments, the cobot 102 may transition into different states while carrying the load 150. For example, the cobot 102 may transition to the intermediate crawling state while carrying the load 150. As another example, the cobot 102 may transition from the intermediate crawling state to the crawling state while carrying the load 150.

In some embodiments, the cobot 102 may transfer the load 150 from the torso 101 to the hands 219*a-b*. For instance, the cobot may position the load 150 off the torso 101 while the cobot 102 is in the crawling state, transition to the standing state, and lift the load 150 using the hands 219*a-b*.

Figure 4:
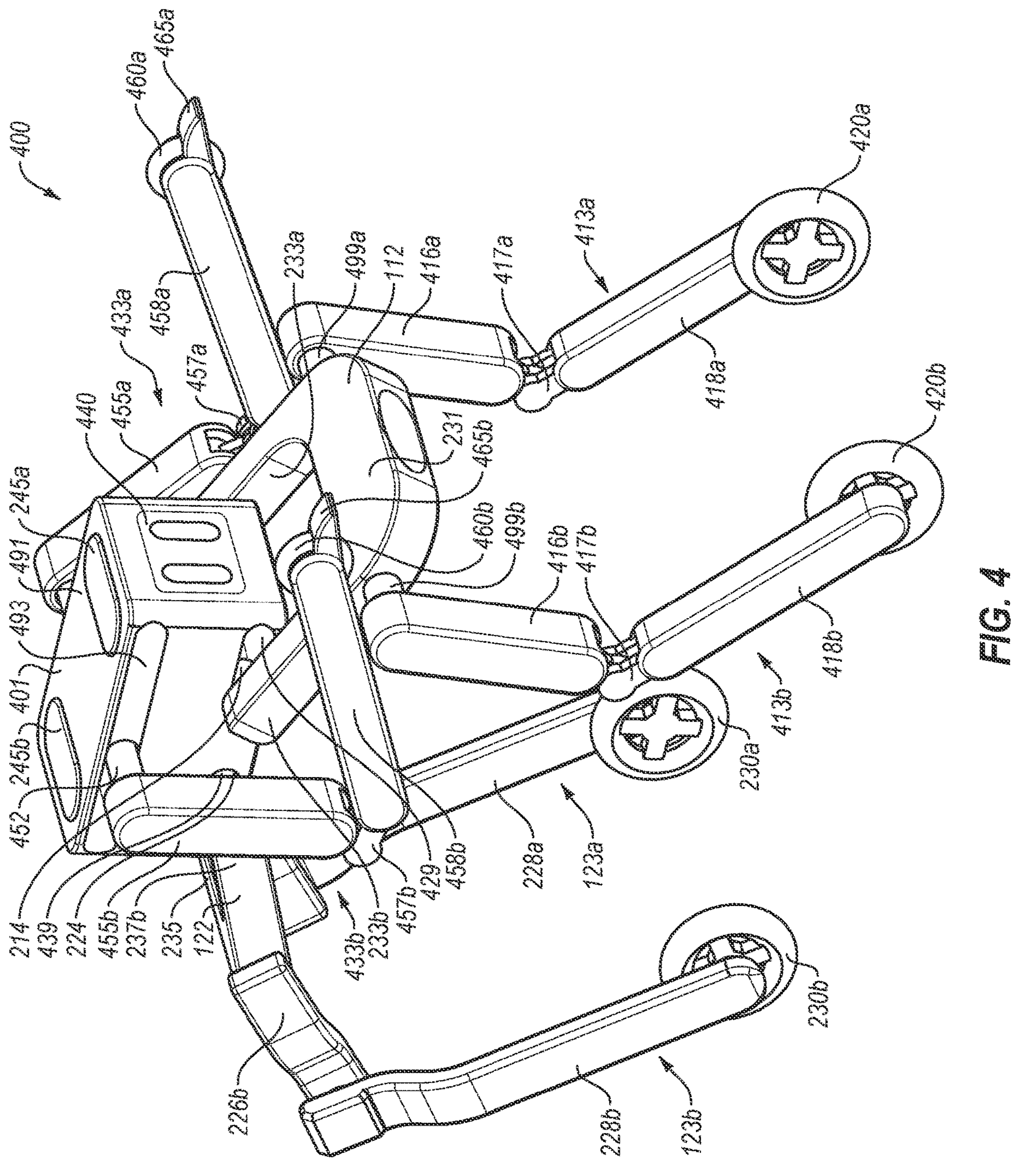
FIG. 4 illustrates an example collaborative robot in a quad standing state.

FIG. 4 illustrates a perspective view of a cobot 400 in a quad standing state, in accordance with at least one embodiment described in the present disclosure. The cobot 400 may operate similarly to the cobot 102 of FIGS. 1-3 except that the cobot 400 may include six appendages 123*a-b*; 413*a-b*; and 433*a-b*, a torso 401 that includes an integrated sensor portion 440, the torso 401 may include a greater height that the torso 101, and the cobot 400 may be configured to operate in a crawling state or the quad standing state, but not the standing state.

The first joint member 112 and the second joint member 122 may be operatively coupled to the torso 401. In particular, the first joint member 112 may be operatively coupled to the torso 401 via the first joint 214 and the second joint member 122 may be operatively coupled to the torso 401 via the second joint 224.

The cobot 400 may include the appendages 413*a-b* that include upper leg portions 416*a-b* and lower leg portions 418*a-b*. The upper leg portions 416*a-b* may be operatively coupled to the first joint member 112 via hip joints 499*a-b*. Specifically, proximal ends of the upper leg portions 416*a-b* may be operatively coupled to the first joint member 112 via the hip joints 499*a-b*. The lower leg portions 418*a-b* may be operatively coupled to the upper leg portions 416*a-b* via knee joints 417*a-b*.

In some embodiments, the first joint 214 may be received by hip openings 429 defined by the torso 401. In some embodiments, the second joint 224 may be received by hip openings 439 defined by the torso 401. The first joint 214 may act as an interface between the first joint member 112 and the torso 401. The first joint 214 may pivot around the first axis to align the first joint member 112 with the torso 401. Additionally or alternatively, the first joint 214 may pivot around the first axis such that the first joint member 112 extends at an angle relative to the torso 401. The angle at which the first joint member 112 extends relative to the torso 401 may be equal to or between one hundred and three hundred seventy degrees in the clockwise direction.

In some embodiments, the first portion of the length of the torso 401 may correspond to a length or a portion of the length of the hip openings 429.

The hip joints 499*a-b* may act as interfaces between proximal ends of the upper leg portions 416*a-b* and the first joint member 112. In addition, the hip joints 499*a-b* may facilitate movement of the upper leg portions 416*a-b* relative to the first joint member 112. For example, the hip joints 499*a-b* may facilitate movement of the upper leg portions 416*a-b* in multiple directions relative to the first joint member 112. As another example, the hip joints 499*a-b* may facilitate pivoting of the upper leg portions 416*a-b* around axes with respect to the hip joints 499*a-b* to facilitate movement of the upper leg portions 416*a-b* along arcs around the corresponding axes. In some embodiments, the hip joints 499*a-b* may include any suitable joints such as prismatic joints, cylindrical joints, planar joints, flexure joints, soft joints, infinite joints, spherical joints, revolute joints, or some combination thereof.

The knee joints 417*a-b* may operate similarly or the same as the knee joints 227*a-b*. The cobot 400 may include a third set of wheels 420*a-b* that are operatively coupled to the distal ends of the lower leg portions 418*a-b*. The third set of wheels 420*a-b* and the second set of wheels 230*a-b* may permit the cobot 400 to move in the crawling state and/or the quad standing state.

The appendages 433*a-b* may include forearm portions 458*a-b* and upper arm portions 455*a-b*. The upper arm portions 455*a-b* may be operatively coupled to the torso 401 via a shoulder joint 452. In particular, proximal ends of the upper arm portions 455*a-b* may be operatively coupled to the torso 401 via the shoulder joint 452. The forearm portions 458*a-b* may be operatively coupled to the upper arm portions 455*a-b* via elbow joints 457*a-b*. Further, the appendages 433*a-b* may include hands 465*a-b* operatively coupled to or operatively coupled proximate to distal ends of the forearm portions 458*a-b*.

In some embodiments, the shoulder joint 452 may be received by shoulder openings 493 defined by the torso 401. In these and other embodiments, the shoulder joint 452 may extend along at least a portion the length of the torso 401 in a direction that is parallel or substantially parallel to the hip openings 429 and/or the hip openings 439.

The shoulder joint 452 may act as interfaces between the upper arm portions 455*a-b* and the torso 401. In addition, the shoulder joint 452 may facilitate movement of the upper arm portions 455*a-b* relative to a third portion of the torso 401. In some embodiments, the third portion of the length of the torso 401 may correspond to a length or a portion of the length of shoulder openings 493. The shoulder joint 452 may facilitate pivoting of the upper arm portions 455*a-b* around axes (e.g., a fifth axis) corresponding to the shoulder joint 452 to facilitate movement of the upper arm portions 455*a-b* along arcs around the corresponding axes.

In some embodiments, the sensor portion 440 may detect loads, obstacles, and/or terrain around the cobot 400. For instance, the sensor portion 440 may include a sensor configured to identify obstacles proximate the cobot 400. In these and other embodiments, the sensor may include any type of sensor suitable to detect the obstacles. For example, the sensor may include a camera and/or a radar sensor that may detect the obstacles.

In the crawling state, the appendages 413*a-b* and 123*a-b* may be in the folded state or the stacked state to reduce a profile of the cobot 400. In some embodiments, a top surface 491 of the torso 401 may serve as a cargo storing region.

In the quad standing state, the cobot 400 may operate similarly to the cobot 102 in the intermediate crawling state. In some embodiments, the appendages 413*a-b* and/or 123*a-b*, the first joint member 112, and/or the second joint member 122, in the quad standing state, may permit the height of the torso 401 relative to the ground surface to be variable. For example, the cobot 400 may adjust the height of the torso 401 relative to the ground surface to position the load on and off the cobot 400 within the range of heights.

The hands 465*a-b* may operate the same as or similar to the hands 219*a-b* of the cobot of FIGS. 1-3. The top surface 491 of the torso 401 may be configured to receive loads by external devices positioning the loads on the top surface 491. Additionally or alternatively, the cobot 400 may position the loads on the top surface 491 of the torso 401 itself.

The cobot 400 may include a first set of wheels 460*a-b* that are operatively coupled to the distal ends of the forearm portions 458*a-b*. The first set of wheels 460*a-b*, the second set of wheels 230*a-b*, and the third set of wheels 420*a-b* may permit the cobot 400 to move in the crawling state, the quad standing state, or between these states. For example, in the crawling state, the cobot 400 may traverse an environment using the first set of wheels 460*a-b*, the second set of wheels 230*a-b*, the third set of wheels 420*a-b*, or some combination thereof.

In the crawling state, the cobot 400 may adjust a wheelbase of the cobot 400 the same as or similar to the cobot 102 of FIGS. 1-3. In the quad standing state, the cobot 400 may adjust the wheelbase of the cobot 400 the same as or similar to the cobot 102 of FIGS. 1-3 in the intermediate crawling state.

In some embodiments, the cobot 400 may be powered using a battery. For instance, the battery may be positioned within the torso 401. In these and other embodiments, the cobot 400 may be configured to swap the battery without powering down to permit continuous use of the cobot 400. In other embodiments, the cobot 400 may be powered using shore power.

In some embodiments, the cobot 400 may be configured to permit different parts of the cobot 400 to detach from the torso 401 to permit the different parts to be independently serviced. For example, the appendages 413*a-b* may be detached from the first joint member 112 to be independently serviced. In these and other embodiments, the cobot 400 may still operate while the detached parts are being serviced.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A collaborative robot comprising:

a torso;

a first joint member operatively coupled to the torso and configured to:

move relative to a first portion of a length of the torso along a plane; and pivot around a first axis to facilitate movement of the first joint member along an arc around the first axis;

a first appendage comprising a proximal end that is operatively coupled to the first joint member, the first appendage configured to pivot around a second axis to facilitate movement of the first appendage along an arc around the second axis;

a second joint member operatively coupled to the torso and configured to:

move relative to a second portion of the length of the torso along the plane; and pivot around a third axis to facilitate movement of the second joint member along an arc around the third axis; and a second appendage comprising a proximal end that is operatively coupled to the second joint member, the second appendage configured to pivot around a fourth axis to facilitate movement of the second appendage along an arc around the fourth axis, wherein the first joint member and the second joint member are configured to position and control a center of gravity of the collaborative robot as the collaborative robot transitions between a crawling state and a standing state.

2. The collaborative robot of claim 1, wherein the first joint member comprises:

a body;

a first member extending from a first end of the body;

a second member extending from a second end of the body; and a joint operatively coupled to the torso, the first member, and the second member; the joint being configured to:

facilitate movement of the first joint member relative to the first portion of the length of the torso along the plane; and pivot around the first axis to facilitate movement of the first joint member along the arc around the first axis.

3. The collaborative robot of claim 1, wherein the second joint member comprises:

a body;

a first member extending from a first end of the body; and a second member extending from a second end of the body; and a joint operatively coupled to the torso, the first member, and the second member; the joint being configured to:

facilitate movement of the second joint member relative to the second portion of the length of the torso along the plane; and pivot around the third axis to facilitate movement of the second joint member along the arc around the third axis.

4. The collaborative robot of claim 1, wherein the second appendage comprises:

an upper leg portion operatively coupled to the second joint member;

a lower leg portion; and a joint operatively coupled to a proximal end of the lower leg portion and a distal end of the upper leg portion, the joint configured to facilitate movement of the lower leg portion and the upper leg portion to permit the collaborative robot to transition between the crawling state, intermediate crawling state, and the standing state.

5. The collaborative robot of claim 4, wherein the lower leg portion is positioned on a different plane than the upper leg portion to permit the second appendage to fold in on itself when the second appendage is in the crawling state.

6. The collaborative robot of claim 4, wherein the second appendage is configured to extend between the second joint member and a ground surface to permit the collaborative robot to transition from the crawling state to the intermediate crawling state.

7. The collaborative robot of claim 4, wherein in the standing state, the second appendage extends away from the second joint member such that the second appendage, the second joint member, and the torso are substantially perpendicular to a ground surface.

8. The collaborative robot of claim 1, wherein the first appendage comprises:

an upper arm portion operatively coupled to the first joint member;

a forearm portion; and a joint operatively coupled to a proximal end of the forearm portion and a distal end of the upper arm portion, the joint configured to facilitate movement of the upper arm portion and the forearm portion to permit the collaborative robot to transition between the crawling state and an intermediate crawling state.

9. The collaborative robot of claim 8, wherein the first appendage is configured to extend between the first joint member and a ground surface to permit the collaborative robot to transition from the crawling state to the intermediate crawling state.

10. The collaborative robot of claim 8, wherein the first appendage further comprises a hand operatively coupled to a distal end of the forearm portion, the hand configured to interact with a load.

11. The collaborative robot of claim 1, wherein the torso comprises a surface configured to receive a load to permit the collaborative robot to move the load within an environment.

12. The collaborative robot of claim 11, wherein the torso includes an anti-skid material coupled to the surface, the anti-skid material being configured to prevent the load from moving relative to the torso while the moving within the environment.

13. The collaborative robot of claim 1, further comprising a ball joint coupled to the first appendage and the first joint member, the ball joint configured to facilitate a plurality of movements of the first appendage, the plurality of movements comprising at least one of flexion, extension, abduction, adduction, internal rotation, external rotation, circumduction, horizontal abduction and adduction, elevation and depression, or upward and downward rotation.

14. The collaborative robot of claim 1, further comprising a third appendage comprising a proximal end that is operatively coupled to the torso, the third appendage configured to:

move relative to a third portion of the length of the torso along an additional plane; and pivot around a fifth axis to facilitate movement of the third appendage along an arc around the fifth axis.

15. The collaborative robot of claim 1 further comprising a battery configured to be replaced without powering down the collaborative robot.

16. The collaborative robot of claim 10, wherein at least one of the first joint member, the second joint member, or the torso are configured to move to compensate for the load when interacting with the load.

17. A collaborative robot comprising:

a torso;

a first joint member operatively coupled to the torso and configured to:

move relative to a first portion of a length of the torso along a plane;

pivot around a first axis to facilitate movement of the first joint member along an arc around the first axis;

a first appendage comprising a proximal end that is operatively coupled to the first joint member, the first appendage configured to pivot around a second axis to facilitate movement of the first appendage along an arc around the second axis, wherein the first joint member is configured to permit the first appendage to move independent of the torso;

a sensor appendage operatively coupled to the first joint member, the sensor appendage configured to:

move relative to the first joint member to transition between a first position and a second position; and identify obstacles proximate the collaborative robot within an environment;

a second joint member operatively coupled to the torso and configured to:

move relative to a second portion of the length of the torso along the plane; and pivot around a third axis to facilitate movement of the second joint member along an arc around the third axis; and a second appendage comprising a proximal end that is operatively coupled to the second joint member, the second appendage configured to pivot around a fourth axis to facilitate movement of the second appendage along an arc around the fourth axis, wherein the second joint member is configured to permit the second appendage to move independent of the torso.

18. The collaborative robot of claim 17, wherein the first joint member comprises:

a body;

a first member extending from a first end of the body;

a second member extending from a second end of the body; and a joint operatively coupled to the torso, the first member, and the second member; the joint being configured to:

facilitate movement of the first joint member relative to the first portion of the length of the torso along the plane;

pivot around the first axis to facilitate movement of the first joint member along the arc around the first axis; and permit the first appendage to move independent of the torso.

19. The collaborative robot of claim 17, wherein the second joint member comprises:

a body;

a first member extending from a first end of the body; and a second member extending from a second end of the body; and a joint operatively coupled to the torso, the first member, and the second member; the joint being configured to:

facilitate movement of the second joint member relative to the second portion of the length of the torso along the plane;

pivot around the third axis to facilitate movement of the second joint member along the arc around the third axis; and permit the second appendage to move independent of the torso.

20. The collaborative robot of claim 17, wherein the second appendage comprises:

an upper leg portion operatively coupled to the second joint member;

a lower leg portion; and a joint operatively coupled to a proximal end of the lower leg portion and a distal end of the upper leg portion, the joint configured to facilitate movement of the lower leg portion and the upper leg portion to permit the collaborative robot to transition between a crawling state, intermediate crawling state, and a standing state.

21. The collaborative robot of claim 20, wherein the second appendage further comprises a wheel operatively coupled to a distal end of the lower leg portion, the wheel configured to facilitate movement of the collaborative robot within an environment.

* * * * *